(12) United States Patent
Klais

(10) Patent No.: US 9,742,661 B2
(45) Date of Patent: Aug. 22, 2017

(54) UNIFORM RESOURCE LOCATOR MAPPING AND ROUTING SYSTEM AND METHOD

(71) Applicant: Pure Oxygen Labs LLC, Madison, WI (US)

(72) Inventor: Brian Klais, Mount Horeb, WI (US)

(73) Assignee: Pure Oxygen Labs LLC, Madison, WI (US)

( * ) Notice: Subject to any disclaimer, the term of this patent is extended or adjusted under 35 U.S.C. 154(b) by 315 days.

(21) Appl. No.: 14/073,753

(22) Filed: Nov. 6, 2013

(65) Prior Publication Data

US 2014/0129733 A1    May 8, 2014

Related U.S. Application Data

(60) Provisional application No. 61/723,576, filed on Nov. 7, 2012.

(51) Int. Cl.
*H04L 12/707* (2013.01)
*H04L 29/08* (2006.01)
*G06F 17/30* (2006.01)

(52) U.S. Cl.
CPC ........ *H04L 45/22* (2013.01); *G06F 17/30876* (2013.01); *H04L 67/327* (2013.01)

(58) Field of Classification Search
CPC ...................................................... H04L 45/22
See application file for complete search history.

(56) References Cited

U.S. PATENT DOCUMENTS

| | | | |
|---|---|---|---|
| 8,849,812 B1* | 9/2014 | Mukherjee | G06Q 30/02 707/728 |
| 2010/0161378 A1* | 6/2010 | Josifovski | G06Q 30/0243 705/14.42 |
| 2012/0278185 A1* | 11/2012 | Ramachandran | G06Q 30/02 705/14.73 |

* cited by examiner

*Primary Examiner* — Suraj Joshi
(74) *Attorney, Agent, or Firm* — Jennifer L. Gregor; James A. Joyce; Godfrey & Kahn, S.C.

(57) ABSTRACT

A uniform resource locator (URL) mapping and routing system and method for generating, routing, and managing URLs is used to route internet users to application landing pages or websites based on a URL mapping scheme. Routing instructions for the URL may route a user accessing a URL to a destination landing page or an alternate landing page depending on routing instructions in the URL mapping scheme.

8 Claims, 15 Drawing Sheets

```
1 <!DOCTYPE html PUBLIC *- //W3C //DTD  HTML  4.01 //EN* "http://www.w3.org/TR /html4 /strict.dtd">
2 <html>
3 <head>
4 <script type ="text/javascript">
5 var startedAT =  new Date();
6
7 function fallback() {
8    window.location =  "http://www.facebook.com /pureoxygenlabs"
9 }
10
11 function checkForFallback() {
12    var now  =  new Date();
13    var seconds =  parseInt((now - startedAt)/1000);
14
15    if (seconds <  5) {
16       window.setTimeout(checkForFallback, 1000);
17    } else if (seconds <  20) {
18       window.frames.fallbackWindow.location =  "http://facebook.test.pureoxygenlabs.com /app_links /pureoxygenlabs
   /fallback?hit_id=525d4e33b98bb62a01000001"
19
20       window.setTimeout(fallback, 2000);
21    } esle {
22       // do nothing
23    }
24 }
25
26 function main() {
27       window.frames.launchWindow.location  =   "fb://profile /144138275637883";
28       window.setTimeout(checkForFallback, 1000);
29 }
30
31 </script>
32 <body onload="main()">
33
```

FIG. 10

Sample iPhone Browsers User-Agent Value:
Mozilla/5.0 (iPhone; U; CPU iPhone OS4_0 like Mac OS X_) AppleWebKit (KHTML, Like Gecko) Version/4.0.5 Mobile/8A293 Safari/531.22.7

FIG. 14A

Sample iPad Browsers User-Agent Value:
Mozilla/5.0 (iPhone; U; CPU OS 4_3 like Mac OS X_) AppleWebKit/533.17.9 (KHTML, like Gecko) Version/5.0.2 Mobile/8F190 Safari/6533.18.5

FIG. 14B

Sample Android Smartphone Browsers User-Agent Value:
Mozilla/5.0 (Linux; U; Android 2.0; en-us; Droid Build/ESD20) AppleWebKit/530.17 (KHTML, like Gecko) Version/4.0 Mobile Safari/530.17

FIG. 14C

Sample Android Tablet Browsers User-Agent Value:
Mozilla/5.0 (Linux; U; Android 4.0; en-us; Droid Build/ESD20) AppleWebKit/530.17 (KHTML, like Gecko) Version/4.0 Mobile Safari/530.17

FIG. 14D

UNIFORM RESOURCE LOCATOR MAPPING AND ROUTING SYSTEM AND METHOD

CROSS-REFERENCE TO RELATED APPLICATION

This application is based on and claims priority to U.S. Provisional Patent Application No. 61/723,576 filed on Nov. 7, 2012, which is incorporated herein by reference in its entirety for all purposes.

FIELD OF THE INVENTION

The present invention relates generally to the field of internet use, and more particularly, to a uniform resource locator ("URL") mapping system for optimizing user experience in connection with such internet use.

BACKGROUND

The increasing use of mobile devices such as smartphones and tablet computers (collectively, "mobile devices") to access information on the internet poses new challenges and new opportunities for internet content providers. For example, the form factors of mobile devices present new challenges due to their smaller screens and touch-based interface. Thus, websites designed for use on desktop computers or laptops may be difficult to use on a mobile device and can be frustrating to users accessing content via the mobile device. On the other hand, mobile devices also offer new opportunities because of new capabilities, such as the ability of users to store and access the internet outside of a traditional internet browser by using web applications ("apps") from these devices, and the ability to access the internet in many different locations, including at a store, restaurant, or other business, or even while traveling to or traveling between such locations.

As a result of new mobile device technologies, internet content providers often develop dedicated "mobile-friendly" versions of their websites, as well as custom-designed apps tailored to the most popular mobile device platforms (e.g., iOS, Android, Windows Phone/8). Internet users have multiple ways to receive and access information on or from the internet using mobile devices, including by accessing URLs in the form of hyperlinks ("links") from emails, QR codes, text messages, chats, or other text conversations, as well as via mobile websites and apps. However, these many ways of receiving and accessing internet information may not be integrated with one another, which may detract from the user experience of accessing internet content using a mobile device. For example, internet content providers' web servers may not be programmed to detect whether a URL contained in an email campaign is being accessed from a mobile device, thus linking the user to the full version of the website, rather than the mobile-friendly version. Another example is that the mobile device on which a URL for a social media platform is being accessed may not detect that the device contains an app for the social media platform, instead routing the user to the internet browser for viewing the full version of the social media website. This scenario may greatly detract from the user experience because often apps for social media platforms remain "logged-in," resulting in an uninterrupted transition to access the content in an app. But, to access the same mobile platform through an internet browser, the user may need to re-enter login information and then navigate to the particular page, which adds several additional steps and additional time to the process. Such an exercise can be frustrating for the user and may discourage them from following the URL to its destination.

One solution to this integration problem is to manually code routing instructions on a content provider's web server using standard server redirect protocols to re-route a URL request to an alternative address. Web developers commonly use this technique to re-route URLs after activities such as redesigning a website or moving to a new URL structure. These types of server redirects are normally coded by website developers who have the technical knowledge to so configure web servers like Apache or Microsoft IIS. As a result, if a URL from another website to the company's website is broken (due to a change of site URL patterns) or if the marketing staff of a content provider wishes to use a more user friendly URL for a campaign (say in a print piece, TV commercial, or SMS message), this requires a request be submitted to their respective web development team, who then must prioritize the request against competing demands, and eventually manually-code the URL redirect change on the web server. Thus, manually-coding this type of conditional user routing and flexibility can be inefficient, time consuming, and generally cost prohibitive for companies to build and maintain with their standard web development resources. A need therefore exists to provide internet content providers with a more efficient method to create, manage, and execute these types of URL routing activities.

As it relates to detecting and opening mobile applications from a web page, alternative subroutines can also be programmed to open apps. This does not solve the integration problem either, however. If an application's "URL scheme" is hard coded into the HTML of a web page as a hyperlink, this line of code causes a device to attempt to open the app. For example, Facebook's URL scheme for its app is currently "fb://" which could be linked via an HTML command <a href="fb://">link here</a>. A device reading "fb://" will attempt to open the Facebook app. However, if the user accessing the URL does not have the Facebook app installed on his mobile device, accessing the URL produces an error—and a negative experience. Thus, a need exists to detect in advance whether an error would be produced and to instruct the mobile device to avoid the error and 'broken' links if an application is present on the device that would not result in an error.

Some mobile operating systems (such as Android) and some browsers already have the capability to give a prompt to the mobile device user accessing a URL, where the prompt offers the mobile device user a choice to open the corresponding application, if the browser determines a corresponding application is installed on the device. But by simply opening a mobile application, rather than opening a specific page within that application, internet content providers forfeit valuable control over the user experience. For example, if a device opens a social media application (such as Facebook), if it is installed, specifically to a company's Facebook profile page, rather than merely opening the Facebook application itself, this specific and direct connection improves the user experience and thereby increases the likelihood the end user will "like" or share information about the company, or interact with the company. This functionality can have particular advantages for companies marketing products and services on the internet because it allows marketers to provide the most relevant internet content to users faster, and may enable marketers to increase mobile advertising conversion rates, application downloads, engagement with social media platforms, and ultimately overall sales. Because it is desirable for internet content providers to have maximum control over the user experience and interaction with the content, a need exists to be able to directly connect users to an appropriate page within the desired mobile application.

Ultimately, providing enhanced user experiences and giving internet content providers maximum control over how users experience internet content will allow content providers to realize more economic benefits by routing users to the media best suited for their device. These economic benefits can be even more valuable if internet content providers can enhance user experiences and manage routing in a cost effective and efficient manner. Thus, a further need exists to integrate application detection capability with URL routing management, so that internet content providers can provide a maximum number of users with a desirable experience in a cost efficient manner.

SUMMARY OF INVENTION

The present invention relates to a system and method for mapping and routing URLs. The method includes the steps of: (1) preparing routing instructions specifying one or more destination landing pages and one or more alternate landing pages based on one or more conditions, (2) receiving device information from a computing device used to access the URL, (3) analyzing the device information against the routing instructions, (4) identifying a destination landing page and an alternate landing page based on the routing instructions, and (5) routing the user to the destination landing page. Upon routing the user to the destination landing page, the system determines whether the user was successfully routed to the destination landing page. If the system determines that the user was not successfully routed to the destination landing page, the system routes the user to the alternate landing page.

Another embodiment of the present invention includes the steps of: (1) preparing routing instructions specifying a destination landing page and an alternate landing page based on one or more conditions, (2) receiving device information from a computing device used to access the URL, (3) analyzing the device information against the routing instructions, and (4) routing the user to the destination landing page. Upon routing the user to the destination landing page, the system determines whether the user was successfully routed to the destination landing page. If the system determines that the user was not successfully routed to the destination landing page, the system routes the user to the alternate landing page.

Yet another embodiment of the present invention relates to a method of generating a URL having a mapping scheme. The method includes the steps of: (1) receiving an inputted destination URL in a form in communication with a URL management system, (2) receiving a specification of at least one preferred landing page, (3) receiving a specification of at least one alternate landing page, (4) storing the at least one preferred landing page and at least one alternate landing page in a mapping database hosted on a server, and (5) generating the URL based on information received in the form.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

BRIEF DESCRIPTION OF THE DRAWINGS

FIG. 10 is an excerpt of source code for one embodiment of an intermediate landing page in accordance with the invention

FIG. 14A is an illustration of an example mobile browser user-agent value for an iPhone used by the URL mapping scheme of FIG. 13.

FIG. 14B is an illustration of an example mobile browser user-agent value for an iPad used by the URL mapping scheme of FIG. 13.

FIG. 14C is an illustration of an example mobile browser user-agent value for an Android phone used by the URL mapping scheme of FIG. 13.

FIG. 14D is an illustration of an example mobile browser user-agent value for an Android tablet used by the URL mapping scheme of FIG. 13.

DETAILED DESCRIPTION

A URL mapping and routing system and method may be used for generating, routing, and managing URLs used to route internet users to website or application landing pages based on a variety of factors. Such factors may include, but are not limited to, the device used (e.g., desktop, laptop, or mobile device); the operating system of the device (e.g., iOS, Android, or Windows); the presence of specific apps installed on the device; the approximate geographic location of the user at the time of the consumption (e.g., by GPS location, IP address, zip code, state, etc.); the time of day the URL is accessed; or any combinations of these or other factors.

A URL mapping and routing system and method is useful for internet content providers, marketers, merchants, and other URL owners and users, seeking to provide an optimal user experience for individuals accessing information on the internet. For example, companies marketing products or services using the internet can use a URL mapping and routing system in accordance with the invention to direct potential users to the website, app, or other landing page that the marketer believes would provide users with the optimal user experience.

As will be described in greater detail below, a URL mapping and routing system also may allow URL owners to modify the mapping protocol of a URL as often as desired. This feature is particularly useful because it allows the URL owner to dynamically change the destination associated with the URL without having to re-code or modify any links associated with the URL based on the user's device or the availability of content now located at a different URL or inside of a different app URL scheme. For example, if Facebook changed its app URL scheme from fb:// to Facebook://, a URL mapping and routing system allows the URL owner to modify any URL being managed with new instructions so as to not make existing URLs or links to the desired landing page obsolete.

Figure 1:
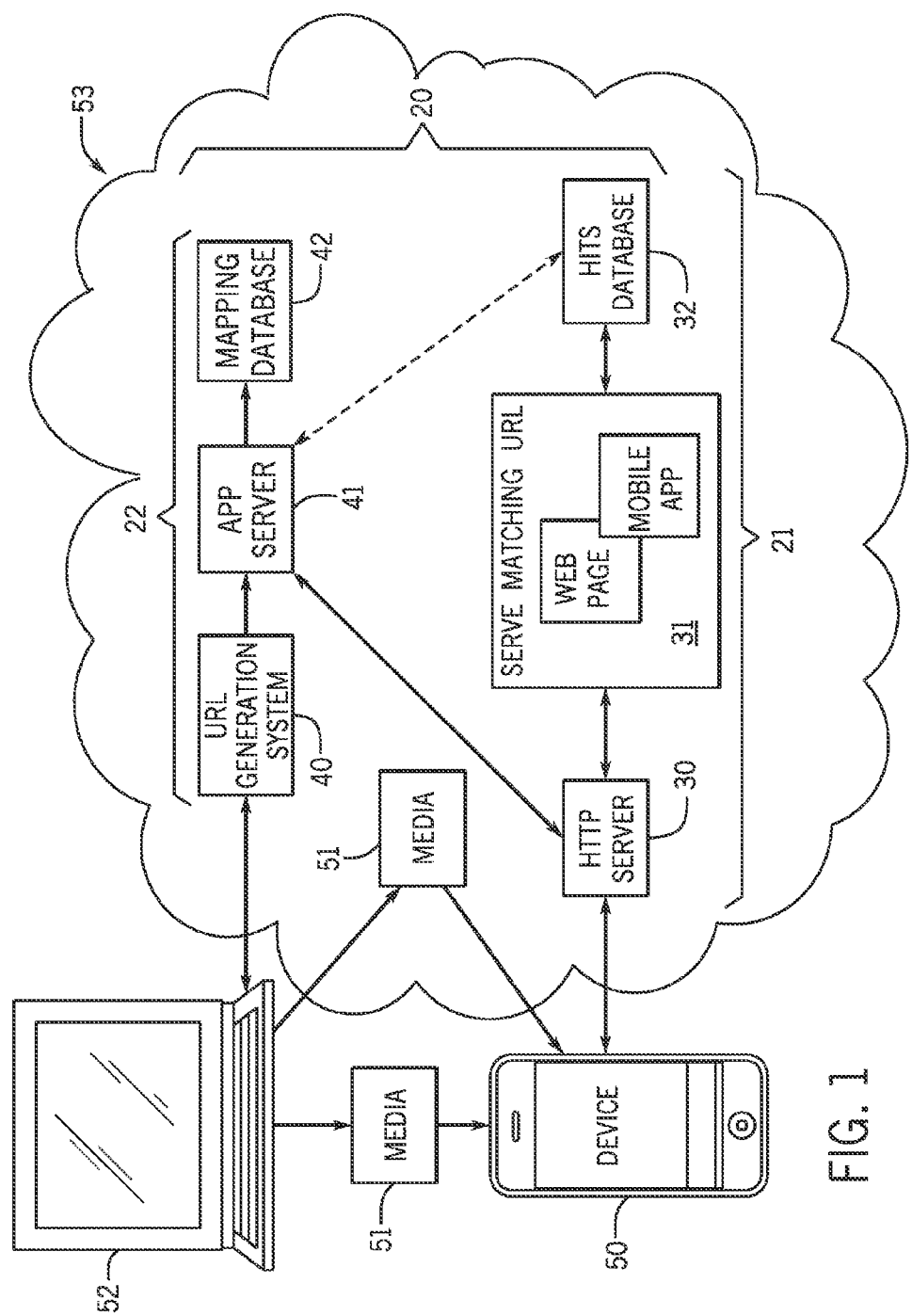
FIG. 1 is a diagram showing the components of one embodiment of a URL mapping and routing system in accordance with the invention.

FIG. 1 shows one embodiment of a URL mapping and routing system 20 in accordance with the invention. The URL mapping and routing system 20 shown here includes multiple components or aspects, which can be used separately or together. One component or aspect is a URL management system 22 and another is a URL resolution system 21. In this example, both the URL management system 22 and URL resolution system 21 are cloud based systems, which interact with a mobile device 50 via the internet 53.

URL management system 22 comprises three basic conceptual components, namely URL generation system 40, application server 41, and mapping database 42. URL generation system 40 is used to create a URL that can be used with URL mapping and routing system 20, namely a "generated URL 47." When a user accesses a generated URL 47 used in connection with URL management system 22, the user is routed to different media types (i.e., webpage, app, etc.) or page locations depending on the routing instructions associated with the URL. Routing instructions may be provided based on variables or conditions, such as, the features of the computing device being used, date, time, location, the presence of a corresponding app, or any combination of these or other factors.

URL resolution system 21 comprises three basic conceptual components as well, namely, HTTP server 30, application detection system 31, and optional hits database 32. The logic or coding for application detection system 31 and optional hits database 32 are located on HTTP server 30 in this example. Of course, the application detection system 31 and optional hits database 32 may be located on a server or in any suitable location without departing from the invention. Persons of ordinary skill in the art will readily understand that the components listed herein are comprised of additional hardware components and sub-systems for accomplishing the functions explained here. Such components may include but are not limited to: servers, routers, computing devices, and internet service providers.

A URL mapping and routing system may include apparatuses and processes for: (1) URL generation, (2) URL management, (3) URL resolution, and (4) URL tracking, each of which are discussed in more detail below. A URL mapping and routing system in accordance with the invention need not have all of these aspects, however, and may also have additional or alternative hardware features and functionality.

I. URL Generation

Figure 2:
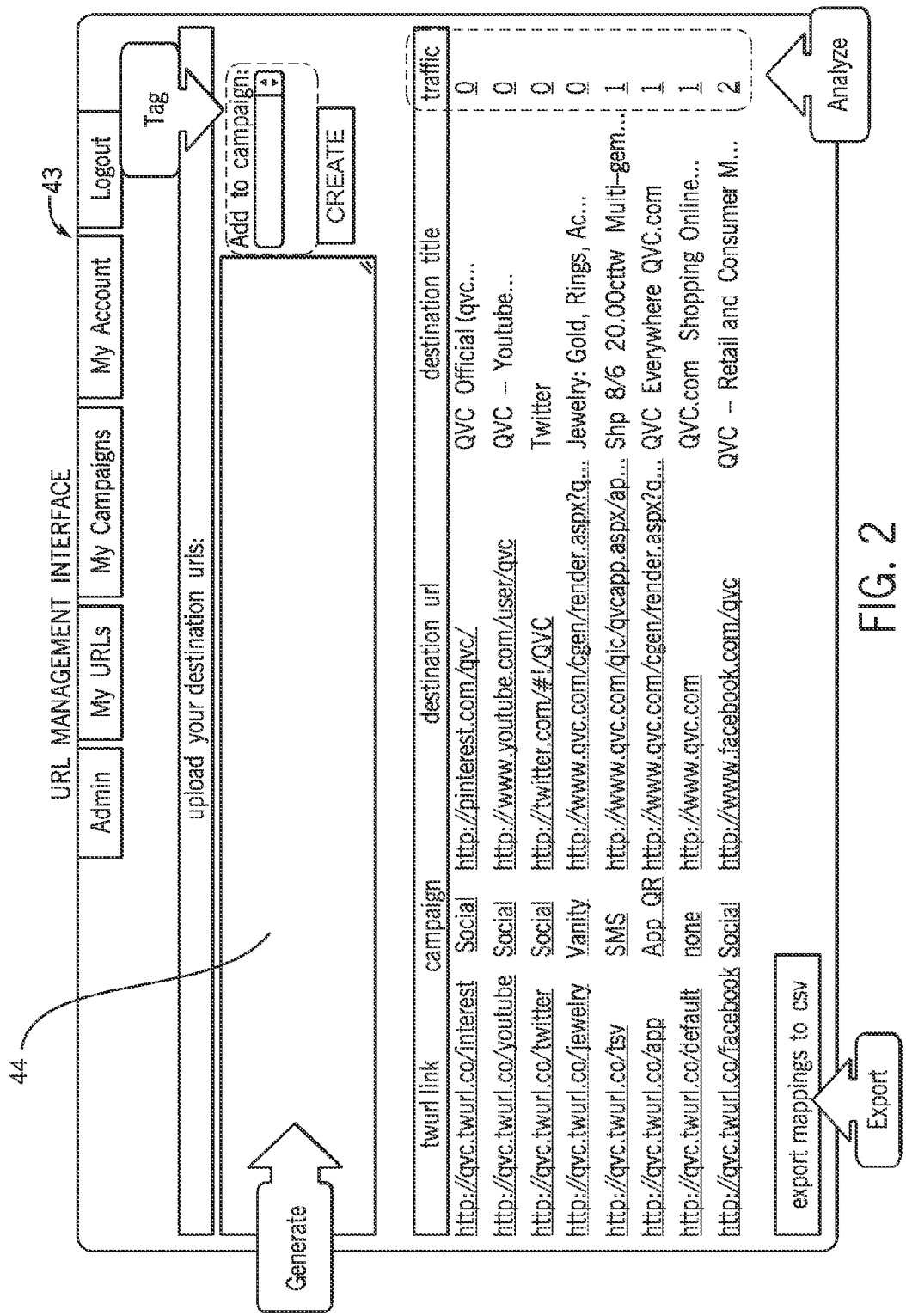
FIG. 2 is an illustration of an example home page of a URL management interface for URL generation in a URL mapping and routing system in accordance with the invention.
Figure 3:
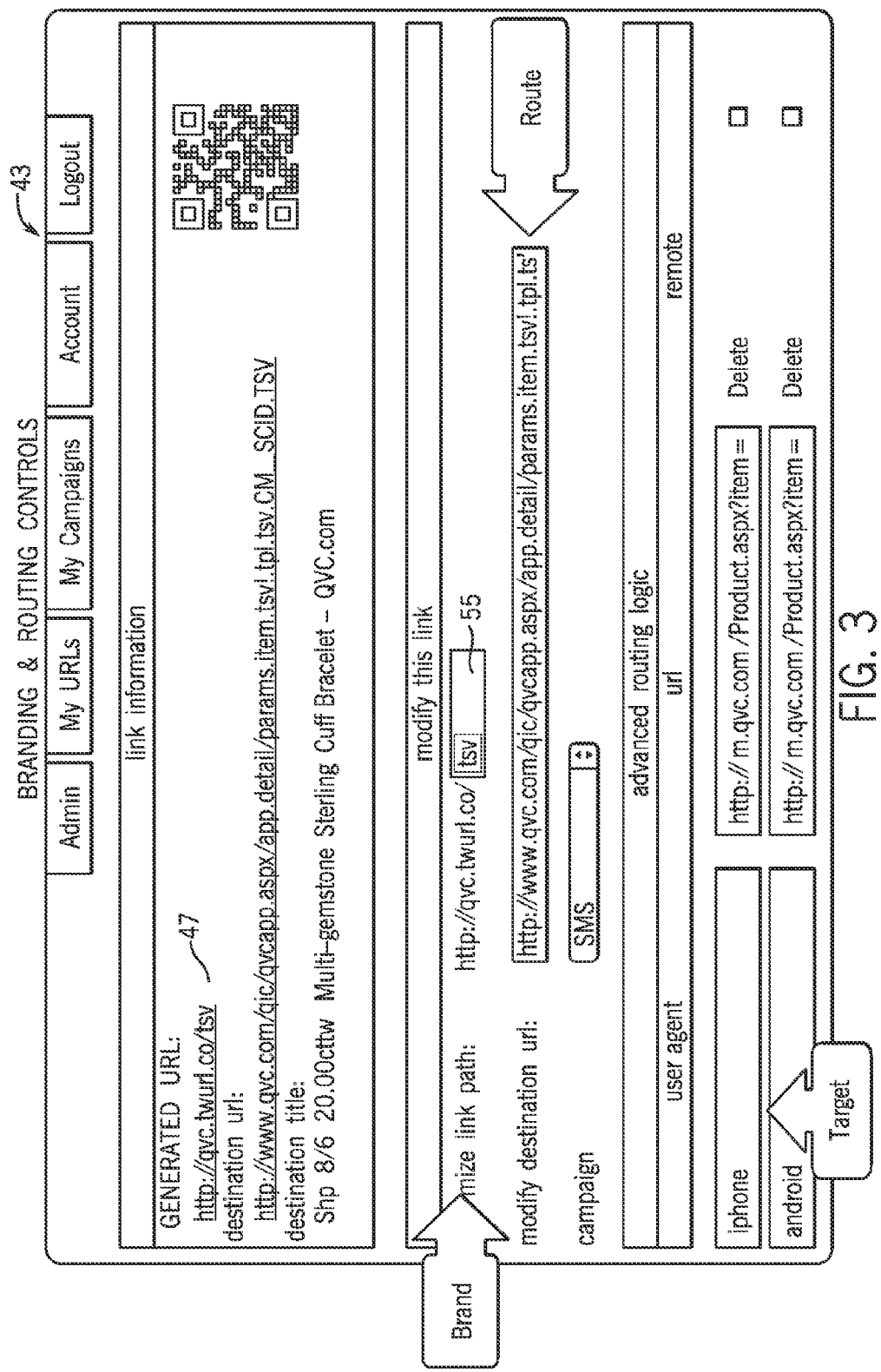
FIG. 3 is an illustration of another portion of the URL management interface of FIG. 2 where individual URL routing can be configured or customized by a URL owner.
Figure 4:
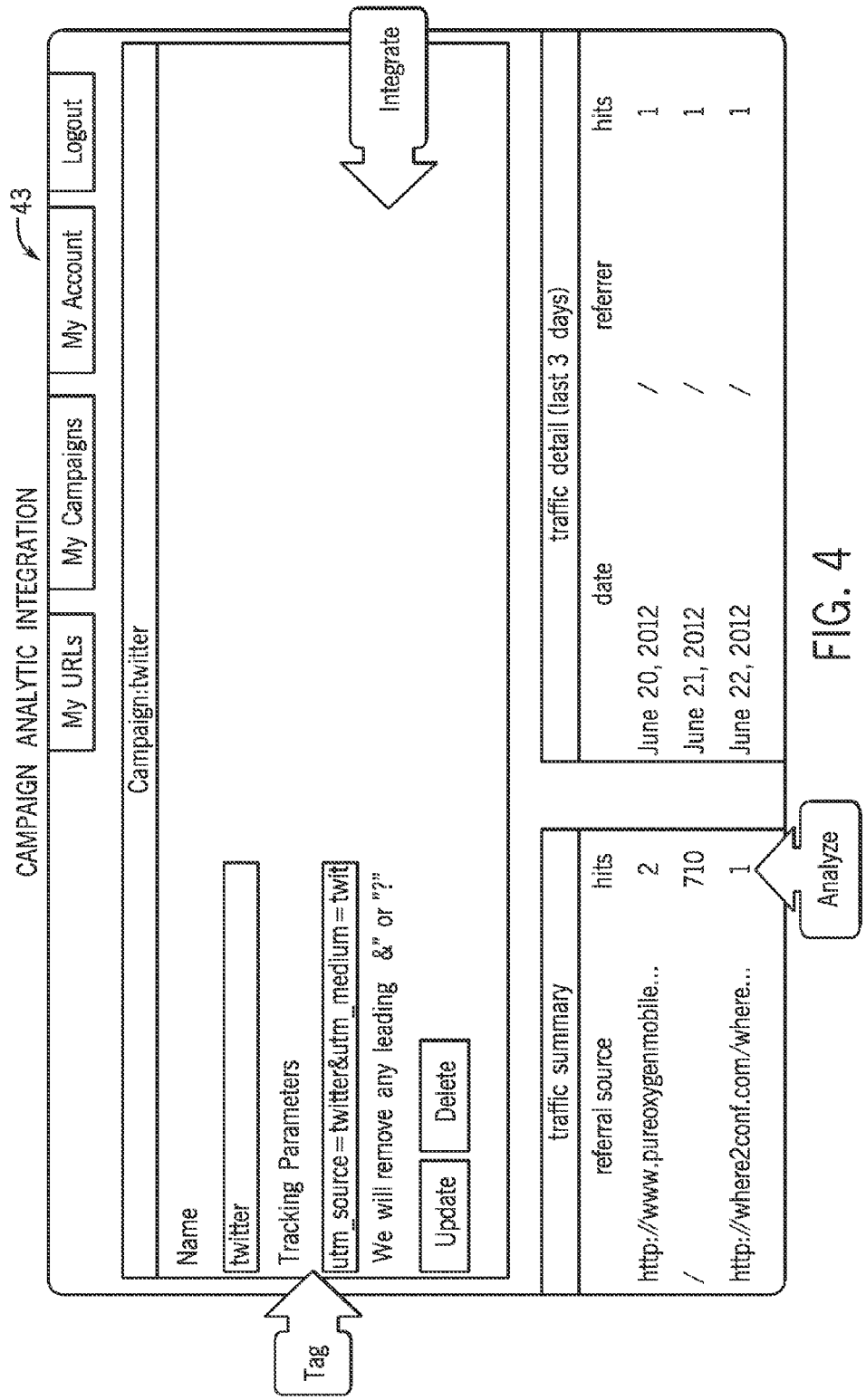
FIG. 4 is an illustration of another portion of the URL management interface of FIG. 2 where statistical and analytical information can be tracked for generated URLs routed and managed in accordance with the invention.

There are a variety of ways that generated URLs 47 may be prepared or identified for use in a URL mapping and routing system 20 in accordance with the invention. For example, a URL management interface 43 may be used to generate, modify, and manage generated URLs 47. An example of a URL management interface 43 is shown in FIGS. 2-4. As shown in the figures, the URL management interface 43 is a web-based interface, but it may also be included in standalone software or any other suitable console or location without departing from the invention. A user of a URL management interface 43 may create generated URLs 47 and can specify and view a URL mapping scheme 70 for each URL. The URL mapping scheme 70 includes any information relating to the generated URL 47 that is stored in the application server 41. Such information may include the type of internet advertising with which the URL would be used, the preferred destination landing page (title and URL), routing instructions, as well as website traffic or analytic information. Generated URLs may be customized or modified in URL management interface 43 as well. FIG. 3 shows a more detailed information screen of the URL management interface 43 shown in FIG. 2, in particular showing the capability to customize branding and routing controls for individual URLs managed using the URL management system 22. As shown in FIG. 3, the user of the URL management system 22 may customize the link path 55 to shorten the URL and to incorporate branding information or company trademarks. A user of URL management system 22 can also specify advanced routing instructions for the URL, specific to the type of device from which the URL is accessed (e.g., desktop, laptop, or mobile device); the operating system of the device (e.g., iOS, Android, or Windows); the presence of specific apps installed on the device; the approximate geographic location of the user at the time of the consumption (e.g., GPS location, zip code, state, etc.); the time of day the URL is accessed; or any combinations of these or other factors. FIG. 4 shows an information screen where the user of URL management interface 43 can track, sort, and view analytic and traffic information for URLs or groups of URLs managed using the system.

Referring again to FIG. 1, URL management system 22 includes software routines hosted on application server 41. In the embodiment shown in FIG. 1, this software provides the URL management interface 43, as well as URL editing and routing forms and instructions, and a data warehouse for the user of the URL management interface to configure, deploy, and track generated URLs 47. Mapping database 42, which stores URL routing instructions for URLs generated by URL generation system 40 is also hosted on application server 41 in this embodiment. Mapping database 42, as well as other components do not need to be on the same server or in the same geographical location, yet could be in use together, as would be readily appreciated by one of skill in the art. When a generated URL 47 is created, its output is in the form of a URL address that follows standard internet protocols (e.g., http://), followed by a domain name (e.g., abc.com), followed by a path name (e.g., /123). For example, http://abc.com/123. Alternatively, the URL management system 22 and mapping database 42 may be stored on a local computer, mobile device 50, or any other suitable computing platform without departing from the invention.

If using a URL management interface 43 for URL generation system 40, a user of the URL management system 22 (for example a merchant, marketer, or other URL owner) may generate a URL in URL management system 22 by use of a form in the interface. A URL owner can enter the desired information including the destination URL into a destination landing page field 44, and then complete the form or other instructions to generate a URL. For clarity, a user of URL management system 22 or URL generation system 40 is sometimes referred to as a "URL owner" or "a generated URL owner," which refers to the ability to modify and manage generated URLs 47 rather than ownership of the internet content associated with the URL. FIG. 2 illustrates an example of where URL generation may occur using the URL management interface 43. As further illustrated in FIG. 2, the application server 41 generates a customizable URL. A URL management system 22 may be used to set-up routing instructions associated with the generated URLs, to shorten, modify, and to otherwise manage generated URLs 47. If a URL owner does not wish to specify or create special routing instructions for a particular URL (in which case an internet-user accessing a URL is simply directed to the URL specified), the URL management system 22 may still be used to manage the URL, and the URL owner may add or modify routing instructions at a later time, if desired.

Figure 5:
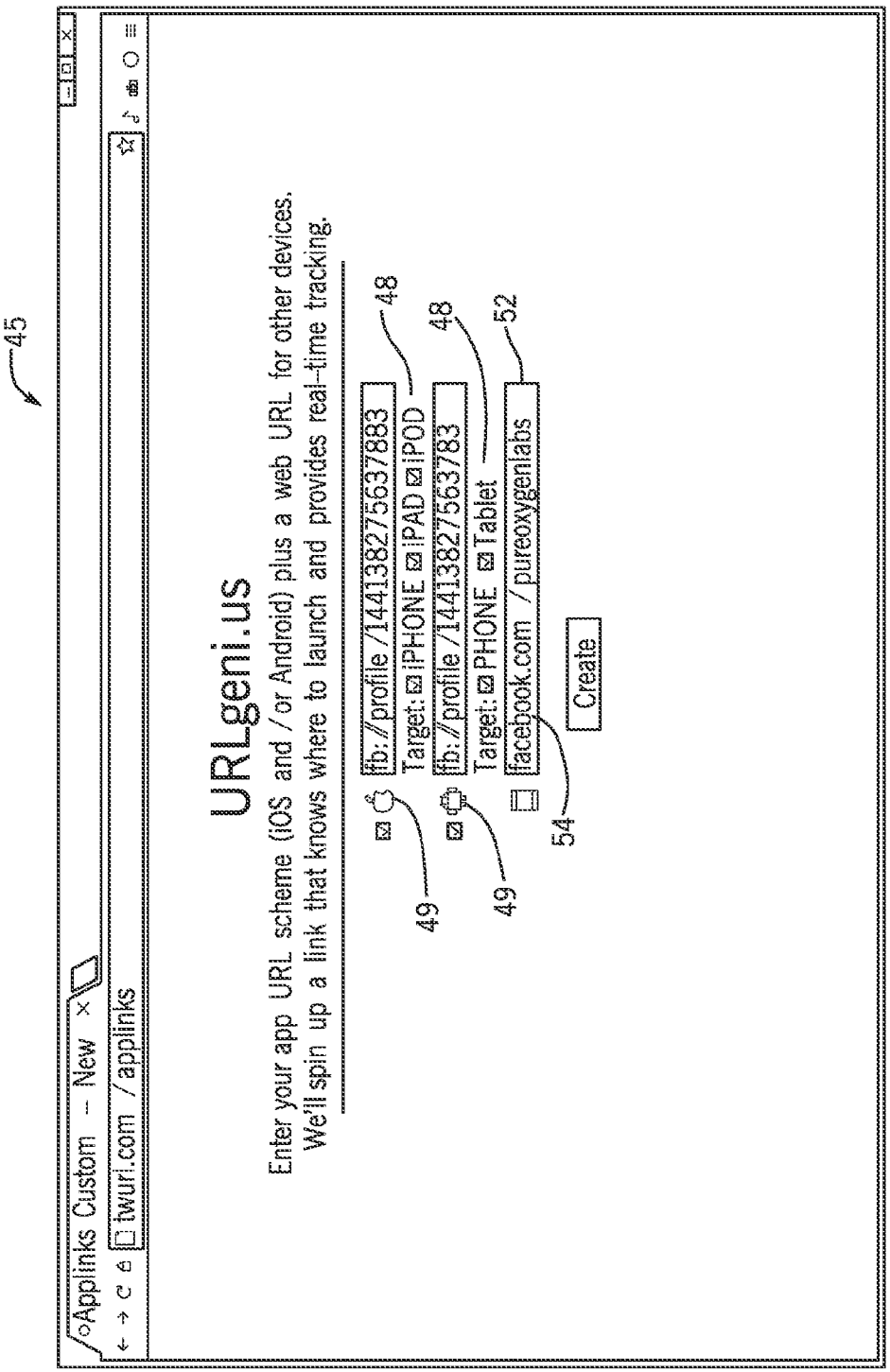
FIG. 5 is an illustration of another embodiment of a URL generation system in accordance with the invention.
Figure 6:
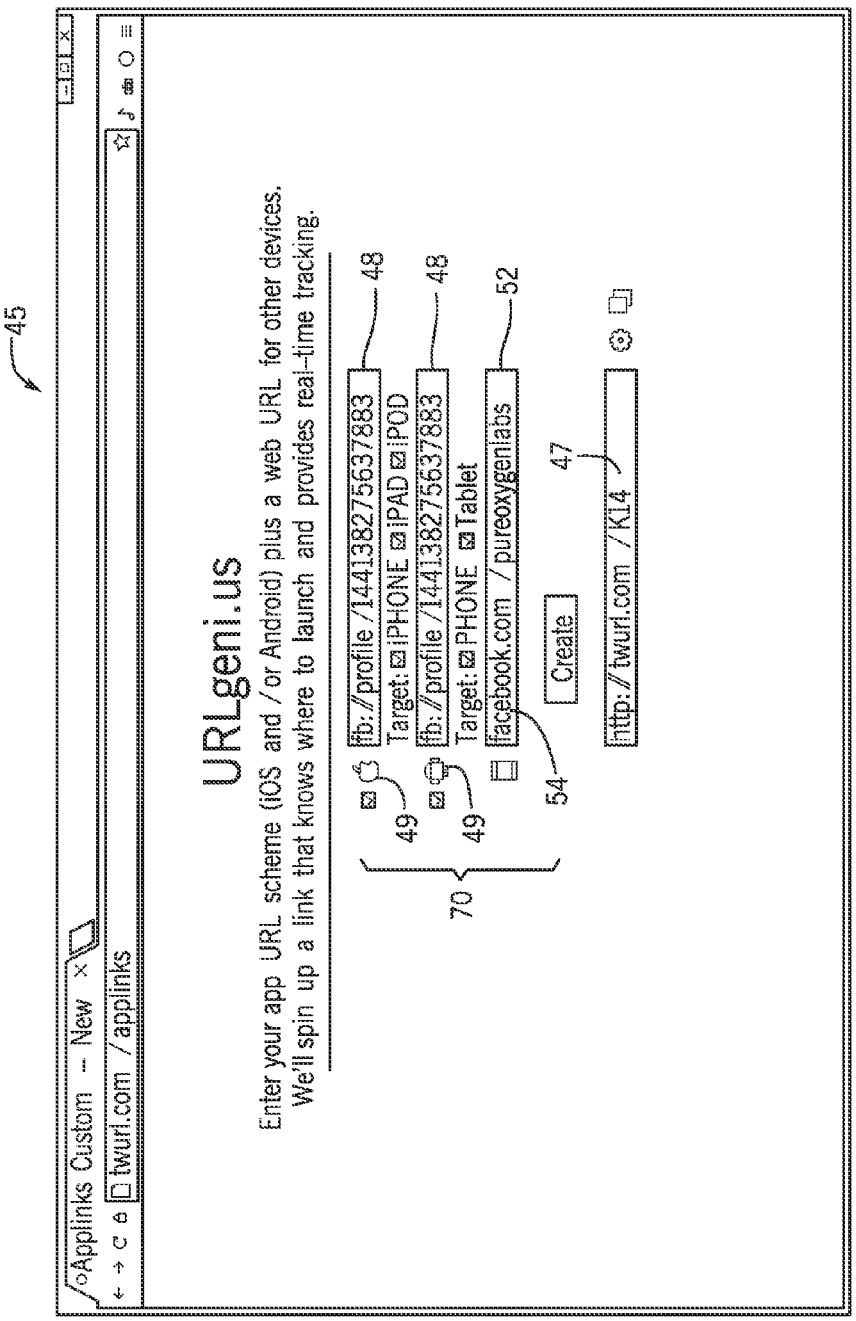
FIG. 6 is another illustration of the URL generation system of FIG. 5, showing a generated URL created by a URL generation system.

FIGS. 5-6 show an alternative URL generation system 40, namely a website based interface 45. The website based interface 45 for URL generation system 40 shown in FIGS. 5 and 6 allows a URL owner generating a URL for use in the URL management system 22 to specify the devices and operating systems for which they want to enable app-detection once their URL is accessed, as well as to identify the desired destination landing pages and alternate landing pages. For instance, in the device fields 48 and the operating systems fields 49, the URL owner may specify all iOS devices or a subset thereof (i.e., iPhones, iPods, or iPads), all Android devices or individual Android phones or tablets, or any combination thereof. In the destination landing page field 44, the URL owner enters the desired application landing page or page within an application that would be the preferred final destination landing page for the user having the desired application on the mobile device 50, (here fb://profile/144138275637883). In the alternate landing page field 52, the URL owner enters the web address for an alternate URL 54, to be used in case the mobile device user does not have the app installed on his or her mobile device 50 (here, facebook.com/pureoxygenlabs). In an alternative embodiment, the destination landing page and alternate landing page may not be preferentially distinct, but only conditionally distinct. In other words, one destination page is not "preferred" to the other, and a user is routed to ether page based on a condition in the URL mapping scheme 70. Variables or factors other than the presence or absence of an app could be used as the basis for conditional routing as well. For example, factors such as the time of day, geographic location, or others could dictate the routing or destination of one landing page over another.

After providing the information necessary to fill the form on the interface, the URL owner submits the form. Assuming all required criteria have been supplied, the submission process then produces a generated URL 47 as a standard "http://" web link as shown in FIG. 6. The generated URL 47 is an address on the application server 41 that includes the URL mapping scheme 70. The URL owner, or any other user, can copy the generated URL 47 and insert it onto their user, website, email, social media, or other marketing materials or media. When the generated URL 47 is accessed by a user, it activates the host platform routing logic to route the user according to the pre-defined device and address mappings specified when the output link was generated.

Figure 7:
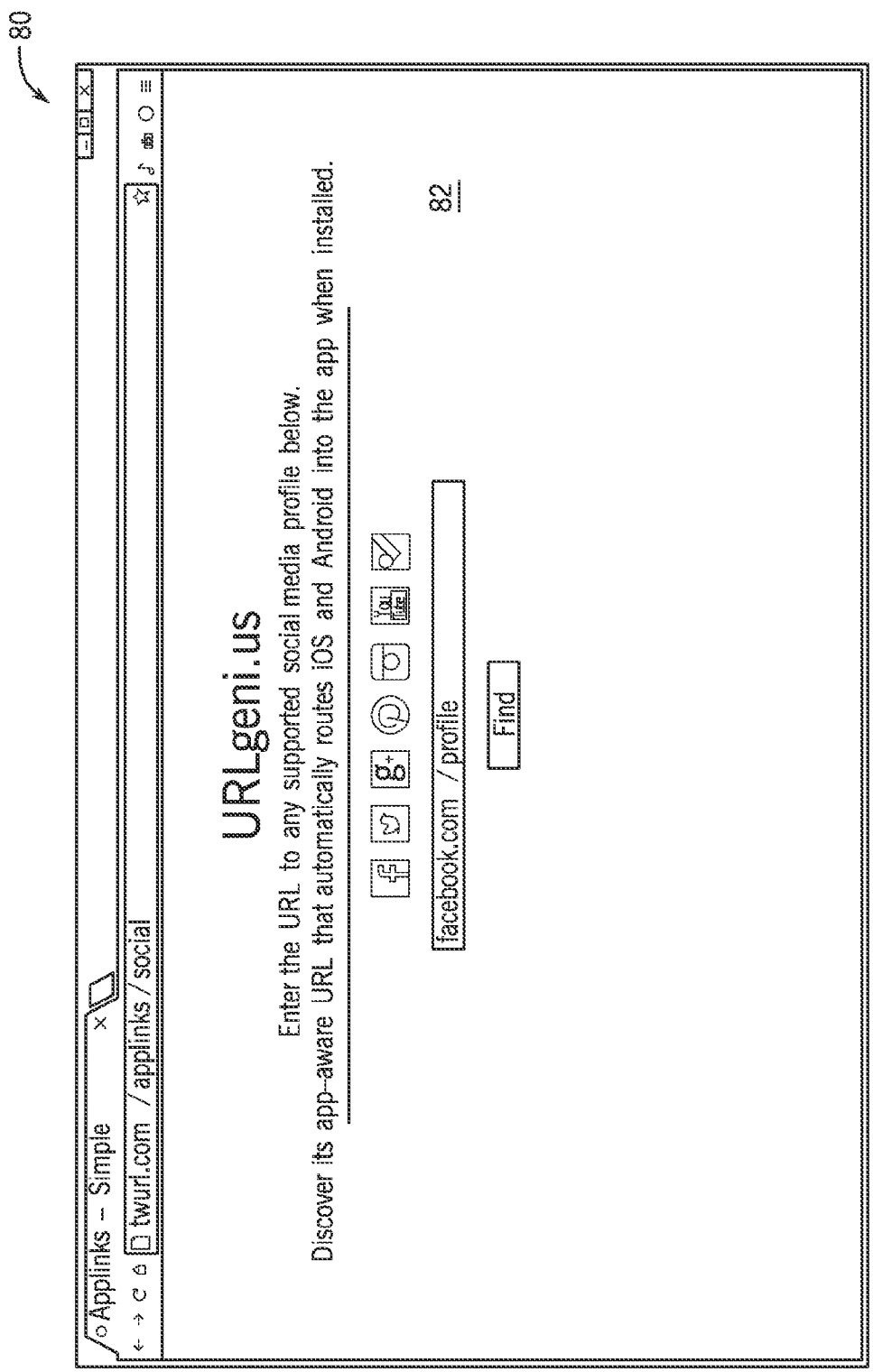
FIG. 7 is an illustration of one embodiment of a search engine interface of a URL generation system in accordance with the invention.
Figure 8:
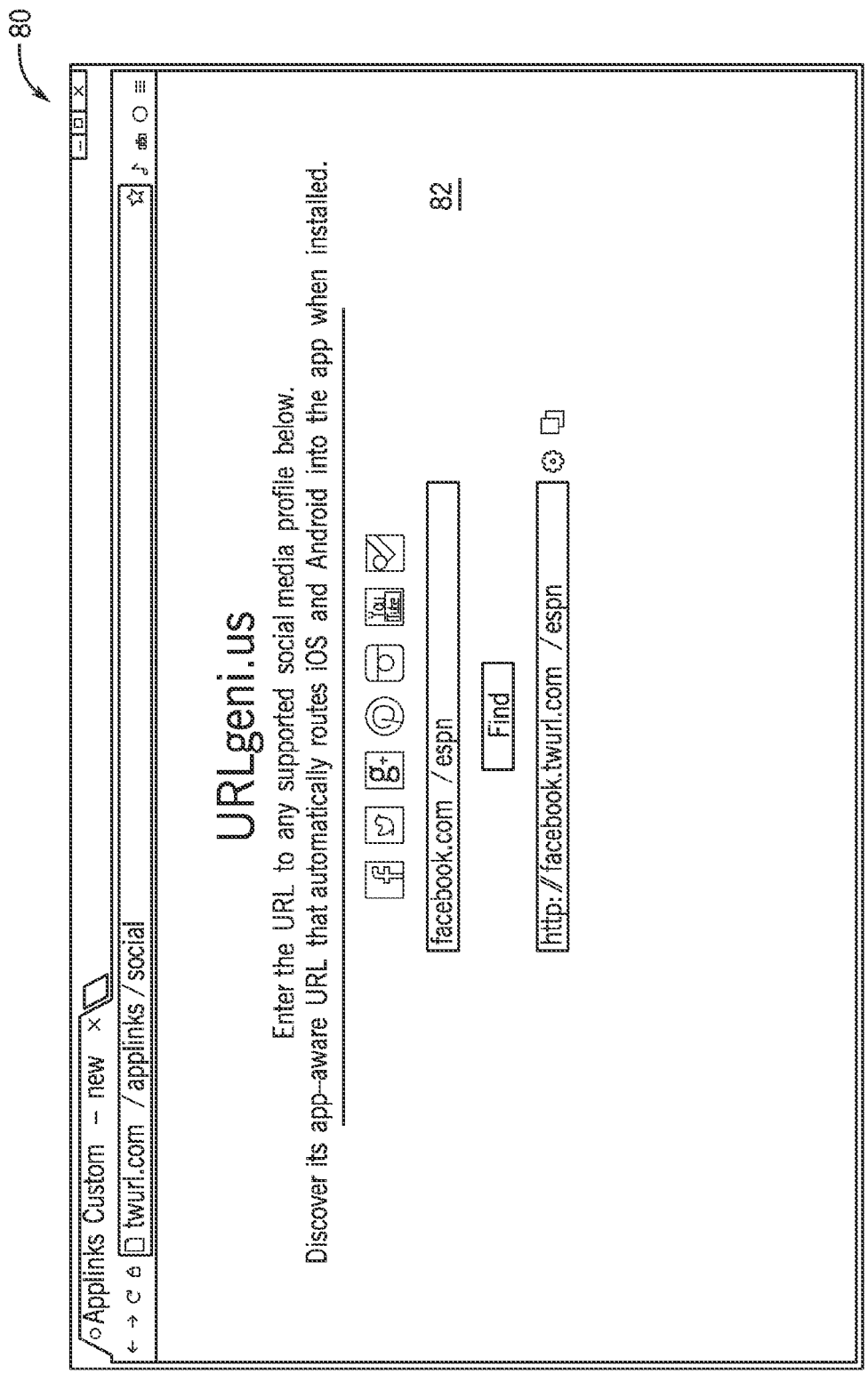
FIG. 8 is another illustration of the search engine interface of FIG. 12, showing a generated URL created by the search engine URL generation system of FIG. 7.

FIGS. 7 and 8 show another way to identify generated URLs 47 using a search engine 80 and search engine interface 82 of URL management system 22, which allows non-technical users to discover and use a generated URL 47 that has been previously indexed on application server 41 and insert the generated URL in the non-technical user's media. The search engine 80 also allows URL owners and URL generators to locate and use previously existing URLs without having to create an account with a URL management system 22 or log into a URL management system. An algorithm powers the search engine 80 that supports searching on billions of social media profile addresses (for example, ESPN's Twitter profile address could be searched for using twitter.com/espn). Once submitted, the algorithm parses similar web addresses to extract unique identification strings (such as, "twitter.com" and "espn"). These identification strings are used to perform a lookup for a previously indexed URL mapping scheme 70 for the given site and app in application server 41. The previously indexed URL mapping scheme 70 for the app is then merged with the identification strings to formulate a generated URL 47 for the equivalent content. For example, ESPN's Twitter profile page app URL would be twitter://user?screen_name=espn. This profile page app URL can then be provided for the user to retrieve. If not previously created, the search engine 80 instructs the URL management system 22 to automatically create a new generated URL 47, which has a default URL mapping scheme that includes preferred landing pages for all available devices and an alternate URL. Of course, other default URL mapping schemes could be used without departing from the invention. The hosted URL is uniquely tied to the identifier string found in the input URL and is housed at [servicename].host.tld/ID (e.g., twitter.urlgeni.us/espn).

A user may also remotely invoke a generated URL 47 for use in the URL management system 22 by simply using the URL syntax described above. For example, an internet content owner might bypass the search engine process or interface form methods described above and simply create a URL based on knowledge of the functionality of the system. For example, a URL owner familiar with the functionality of the URL management system 22 may learn that the general format of generated URLs 47 for use with the URL management system have the following format: [servicename].host.tld/ID. Thus, a URL owner, such as ESPN, may include in it its website or email campaign footers to its Twitter profile using the URL "twitter.urlgeni.us/espn". When clicked by a user, this URL would automatically be associated with routing instructions, and traffic stats and success rates may be tracked by the URL management system 22. Likewise, to make any URL function in the URL management system 22, a URL owner may simply supply the URL syntax: [social-media-site].urlgeni.us/[target-handle]. Provided that a verifiable profile page exists at the corresponding URL [social-media-site].com/[target-handle], this link syntax automatically activates the default URL mapping scheme for mobile device users with, or without, the app installed, and reports on statistics at a [social-media-site].com/[target-handle]+URL. Of course, alternative URL's may be used without departing from the invention. The URL's listed here are examples only, and have no other significance.

II. URL Management

URL management system 22 supports the generation, management, and mapping of generated URLs 47. As explained above, URL management system 22 includes the software that provides URL generation system 40, and also includes application server 41 and mapping database 42, which provide the "back-end" operations for mapping and routing generated URLs 47. URL management system 22 also provides the ability to have dynamic mapping conditions insofar as a single generated URL 47 could have unlimited numbers of target operating systems and devices mapped (by way of browser user-agent detection) and/or unlimited numbers of target apps or landing pages mapped. URL management system 22 may also allow for management and modification of the generated URLs 47 and URL mapping schemes 70.

One way to manage, modify, and track information in the system is through the use of a URL management interface 43. For example, consider a merchant who is running a SMS or QR code campaign incorporating a link to a generated URL 47 for a page where a user may purchase a particular product. If inventory of that product becomes depleted or exhausted, the merchant can easily modify the URL mapping scheme 70 for that particular generated URL 47 to route internet-users to a landing page for a substitute product or different destination landing page. That is, the URL mapping scheme 70 associated with a generated URL 47 can be modified without modifying the generated URL itself. As another example, merchants may also modify the URL mapping scheme 70 by selecting different routing instructions based on other factors, such as, geographic location, time of day, the device-type used, or other attributes of the internet-user accessing the generated URL 47. This type of URL management can be carried out indefinitely and for many target systems and landing pages, all for a single generated URL 47 or many generated URLs.

In addition, many websites encourage users to share page content with their followers on popular social networks by clicking a "share" button. Using a generated URL 47, the "share" button can be utilized for this purpose as well to help users bypass redundant sign-in web forms and automatically launch a social media site's sharing functionality directly inside the social media app. To activate this routing remotely, a web designer or URL owner simply links the "share" button URLs to a standard syntax, such as [social-media-site].urlgeni.us/[URL] where [social-media-site] represents the network like Twitter, Facebook, Google+, etc., and [URL] represents the pre-populated address to that social media site's functionality page. This [URL] value typically passes on parameters like the web page address to share, the title of that page, any hashtags, or other default messages that pre-populate the mobile device user's message to followers. When a mobile device user accesses such URLs to share content with their social network, an algorithm parses the complex string to identify the essential parameters, transforms the web URL into a generated URL 47 that similarly pre-populates the sharing dialog inside the app in real-time if and when the app is installed on the user's mobile device 50. Thus webmasters or URL owners gain a simple, dynamic method to quickly optimize website portability at scale for sharing amongst app users. For example, ESPN encourages users to share an article page by providing a "tweet" button at the top of the page. This tweet button links to this sharing functionality page at Twitter. When mobile device users click to share that web link from their mobile device 50, they are often routed to a mobile browser web page and greeted with a sign-in prompt by Twitter. To increase sharing activity amongst mobile users, ESPN could simply replace the existing link to Twitter's sharing functionality with a link that would automatically route a user to the twitter mobile app sharing functionality page. This will bypass signing-in if the mobile device user has the app installed on his or her mobile device 50. In addition, any internet user may anonymously view traffic statistics for that social link by appending a special character (such as "+") to the end of the link address (for example twitter.urlgeni.us/espn+).

Generated URLs 47 can be incorporated into numerous types of advertising campaigns or communications. For example, the URLs generated by URL management system 22 may be incorporated into media such as advertisements (both print and electronic), social media communications, email communications, SMS text messages, and QR codes. Additional systems and computing devices and software may be used to incorporate generated URLs into media 51 as shown in FIG. 1. Even after a link has been included in a campaign, regardless of how it was generated, whether through URL management interface 43, website based interface 45, search engine 80, or URL syntax, URL management interface 43 can be used to edit the routing instructions in real-time, without negatively impacting the operability of the link generated by URL management interface 43.

Generated URLs 47 may also be created automatically by the URL generation system 40 for purposes such as friend request notification emails or other targeted communications. For example, if someone sends a "friend request" using Facebook to a new contact, the new contact receives an email notification of the pending request. The email notification may include links to view the requester's profile or to accept or deny the request. When Facebook generates the email, it can use a standard syntax for the links, such as Facebook.urlgeni.us/[URL] where [URL] represents the pre-populated address to the desired landing page in the Facebook app.

III. URL Resolution

URL resolution processes provide the actual routing of the mobile device accessing a generated URL 47. FIGS. 9-14 are various illustrations showing embodiments of URL resolution processes.

Figure 9:
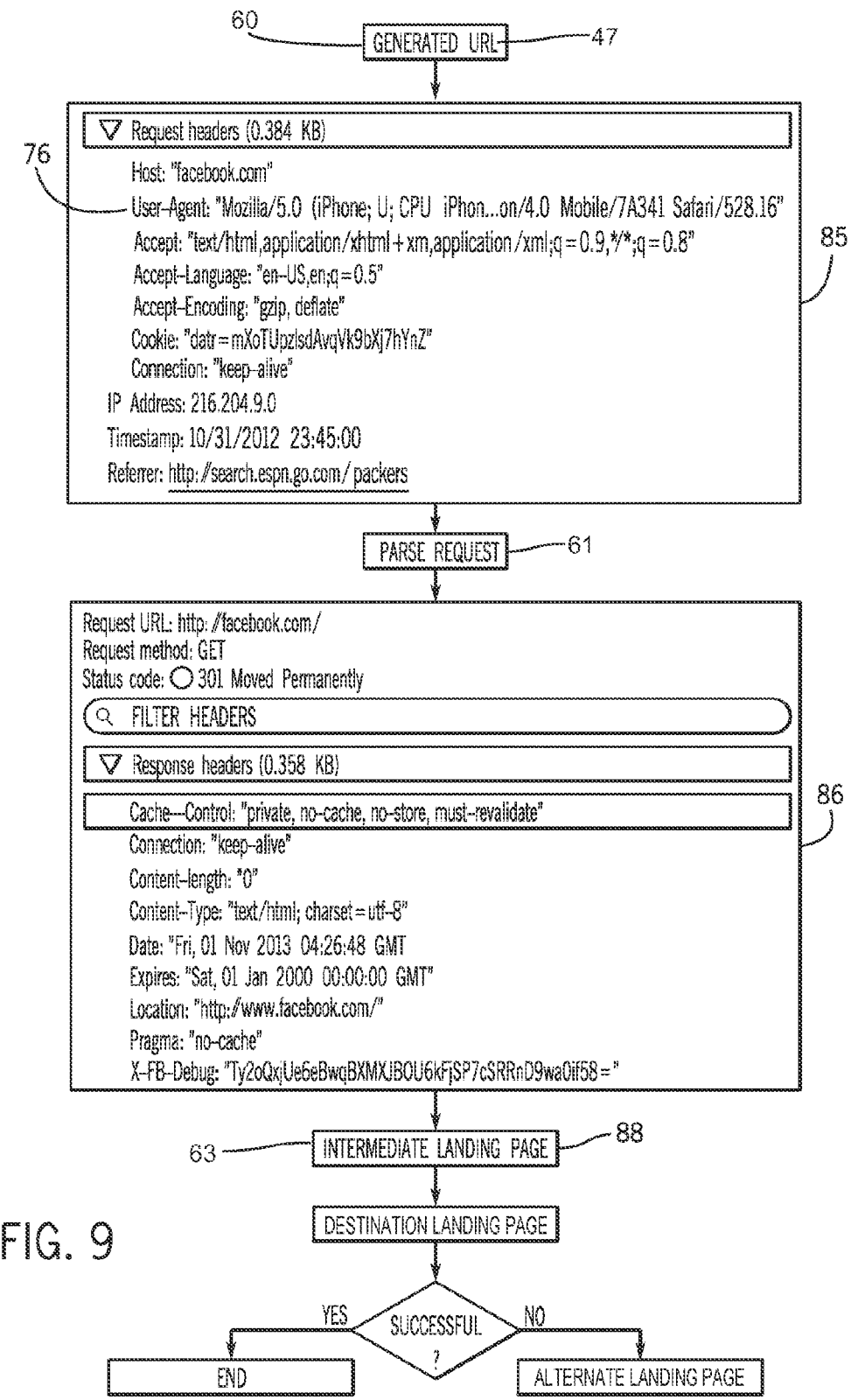
FIG. 9 is a flowchart illustrating the process steps performed by a URL resolution system in accordance with the invention.

FIG. 9 illustrates an example process performed by a URL resolution system 21. A mobile device user accesses the generated URL 47 by clicking on it just like any other link to access the information associated with it. If a URL mapping scheme 70 is specified for a generated URL 47 produced by URL management system 22, when the generated URL is are clicked by a mobile device user, software on application server 41 analyzes information contained in a header request 85 received from the mobile device 50 against the routing instructions in mapping database 42. The header request 85 is a string of information, including but not limited to, a host URL (e.g., facebook.com) as well as the browser's identifying user-agent string 76 (e.g., "Mozilla/5.0 iPhone . . . " indicating an iPhone is requesting content from the server), the IP address the request is being made from, the time and date stamp, the referring site (if applicable), and browser settings for language, compression, and cache. Examples of user-agent strings 76 are shown in FIGS. 14A-D.

Information contained in the header request 85 as strings may be parsed in real-time for purposes of redirecting the user to content that has been pre-determined as optimal (e.g., a specified destination landing page). For example, a generated URL 47 might have a URL mapping scheme 70 set to parse the user-agent string 76 to route "iPhone" consumers to a page to download an app made for iPhone users based on the presence of a specified user-agent string 76. The URL mapping scheme 70 for the generated URL 47 may also redirect requests made from the "Android" user-agent string to a page to download an app for an Android tablet. As another example, the date stamp of the request can be used to allow URL owners to specify a URL mapping scheme 70 based simply on the time of day the link is clicked. The mobile device's 50 IP address can be used to determine the user's city and state, which may be used to route users based on geographical considerations. Following are other non-limiting examples of how the information contained in the header request may be parsed and used: (1) a non-empty "referrer" value might be used to indicate the consumer came from another web site, instead of from a QR code or an SMS—neither of which can leave a "referrer" URL value since they are not web media, and (2) a "cookie" value might be checked to determine whether the consumer has previously identified any preferences like whether they prefer to open a specific app (e.g., Facebook) versus the web page equivalent. Of course, depending on the values of these headers or the values stored in files they represent, the routing of that consumer might vary. The information contained in the header request may also be used for any other purpose without departing from the invention.

Figure 13:
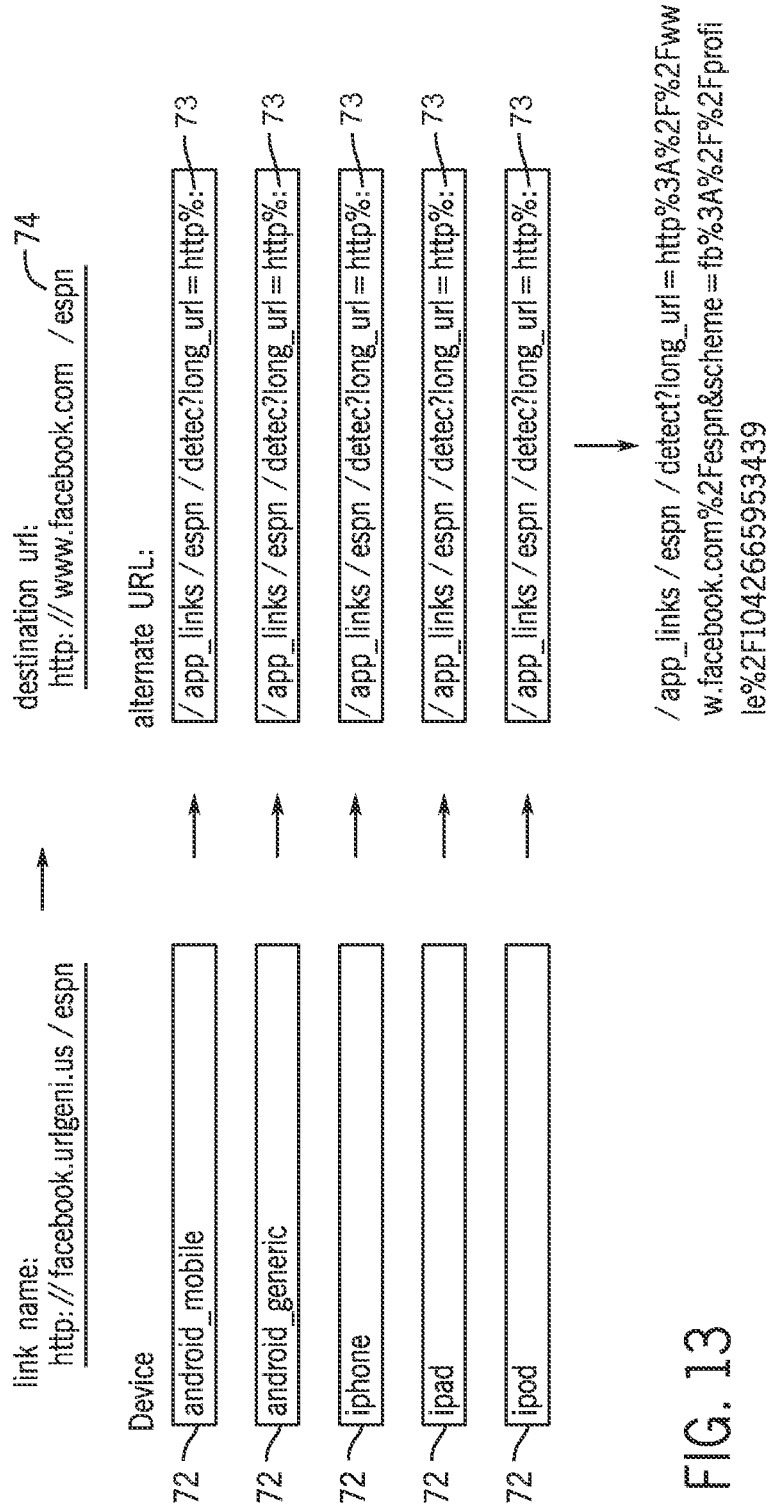
FIG. 13 is an illustration of one embodiment of a URL mapping scheme in accordance with the invention.

As shown in FIG. 13, the browser user-agent string 76 of a web browser on the mobile device 50 contains information that allows identification of the type of device (e.g. iPhone 4, iPhone 5, Android powered mobile phones, etc.), and the web browser being used (e.g., Safari, Chrome, etc.). This device-type and browser type information can also be used in the URL mapping scheme 70 as well. In URL management system 22, this type of information can be used by routing logic to determine the routing instructions to be applied to that particular mobile device 50.

Once a header request 85 has been made by a browser, web protocol requires the server respond with a header response 86. The header response 86 contains handling instructions for the content requested that the browser can then execute. Header responses 86 can and do vary greatly between websites, but the basic elements include the request method, the status code, what type of formatting the content uses, a timestamp on the content served, caching instructions, whether to set a cookie, and when the cookie expires, and any redirect information (the "location" field). The location field tells the browser where to re-route the user if necessary. A simple example of this is if a mobile device 50 requests "facebook.com" the location field may tell the browser to re-route the user to www.facebook.com.

Referring back to FIG. 1, when a mobile device user using mobile device 50 clicks on a generated URL 47, user information is received by HTTP server 30 via the internet 53. HTTP server 30 communicates with application server 41 to retrieve routing instructions based on the URL mapping scheme 70 from mapping database 42. Software on application server 41 allows the header response "location" field values to be populated dynamically and in real-time, based on the URL mapping scheme 70. Every element of the URL mapping scheme 70 that a user defines can have a destination URL mapped to it.

Referring back to FIG. 9, when a URL is requested by a user, the HTTP server 30 caches the header request 85 values, and performs a lookup in the mapping database 42 to determine if the requested URL has a URL mapping scheme 70. If so, application server 41 parses the header request values and performs a lookup against the mapping database 42 for the URL. If a match is found, the URL mapped for that condition is then retrieved from the mapping database 42 and is used to dynamically populate the "location" value in the HTTP server's 30 header response 86 back to the browser. HTTP server 30 then performs a permanent redirect of the browser URL to the new destination, that is, the destination that was identified in mapping database 42. Thus, for URL requests that meet the conditions specified in instructions associated with generated URLs 47, application server 41 responds with a web server status code (typically a "301 permanent redirect," although other types of redirects could certainly be used), set to route the matching user to an intermediate landing page, or launch page according to such routing instructions. In the embodiment shown, the intermediate landing page 88 is a blank web page, but in the background there is a script 89 (see FIG. 10) that is executed to ultimately route the user to either a destination landing page or an alternate landing page. Header requests 85 that do not match established conditions present in the URL mapping scheme 70 are redirected to an alternate landing page, or are otherwise redirected based on the URL mapping scheme. If application detection system 31 is enabled for a particular URL, that process will also be run. If tracking information is being recorded as discussed below, tracking is logged in hits database 32. It should be understood that, other than in connection with URL management interface 40, alternative ways of offering the use of application detection system 31 and other customizations for generated URLs 47 could also be used, for example through customer service representatives.

Figure 11:
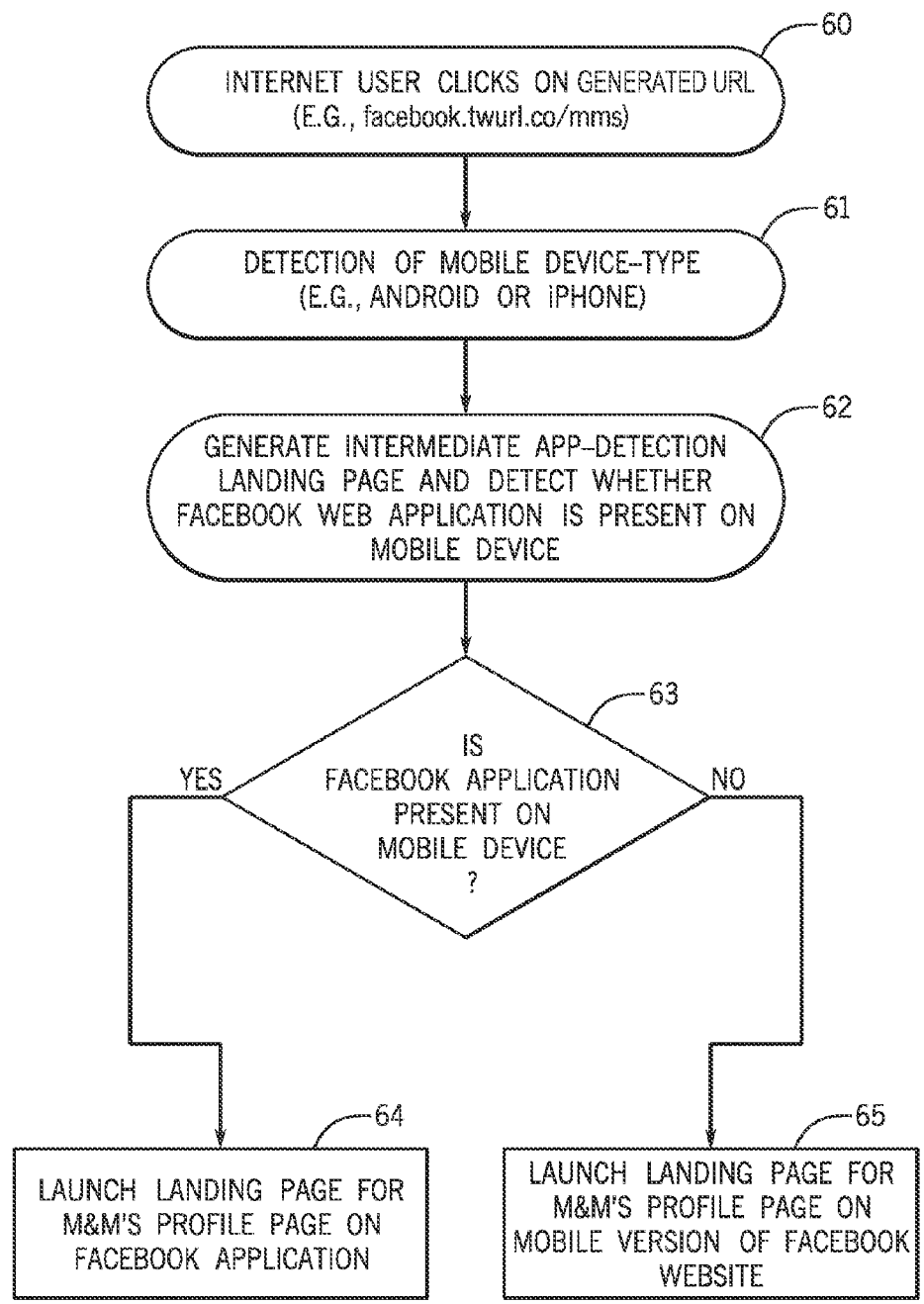
FIG. 11 is another flowchart illustrating the process steps performed by a URL resolution system in accordance with the invention.

As shown in the process illustrated by reference to FIGS. 9-14, when URL resolution system 21 is activated by accessing a generated URL 47, software on HTTP server 30 performs a process to route the user to a destination landing page. In FIG. 1 this process is represented by application detection system 31. When the generated URL 47 is accessed, HTTP server 30 accesses the URL mapping scheme 70 from mapping database 42. In this example, as shown in FIG. 11, URL resolution system 21 is initiated with step 60 when a mobile device user clicks on the generated URL 47, for example, http://facebook.twurl.co/mms. The URL mapping scheme 70 for this generated URL 47 is such that the destination landing page is the M&Ms profile page on the Facebook app, but if the Facebook app is not present on the mobile device 50, the URL resolution system 21 is programmed to route the mobile device 50 to an alternate URL 74, namely M&Ms profile page on the mobile version of the Facebook website. After the generated URL 47 is accessed by the mobile device user in step 60, URL resolution system 21 runs a process to detect the type of mobile device 50 that was used to access the URL, as represented by step 61.

As shown in FIG. 9, step 61 determines, based on the value in the browser user agent string 76, what type of device is accessing the generated URL 47. In step 62, an intermediate landing page 88 is generated that matches conditions specified in the URL mapping scheme 70, for example, different intermediate landing pages are generated for iPhone 4 users and for Android users. Other examples of conditions may be that the device is a mobile device 50 rather than a tablet or desktop computer, or conditions related to other device-types.

As shown in FIG. 10, the intermediate landing page 88 contains a combination of HTML and JavaScript used to attempt to open a specified app on the mobile device 50 by way of loading its "application URL scheme" (for example Facebook's app URL scheme is fb://). In the embodiment shown, the intermediate landing page 88 uses an HTML "frame" containing the JavaScript. An HTML frame is a standard web element tag that any web page can utilize to incorporate content from other URLs. Frames work by displaying such content within a specified frame, or bordered box, inside the original web page. As an example, a news web site might give users a search box such that when a keyword is submitted, it populates a window frame beneath the search box with search results that are derived by a search engine like Google. Even though the address that shows up in user's browser address bar is still that of the news site's original page, the content inside such a frame can come from a different address, like www.google.com.

Setting the HTML frame location to one specified by the generated URL 47 tells the user's browser to request that URL. For mobile operating systems like iOS, loading an app's URL in this manner causes the browser to request the app URL. If the mobile device 50 recognizes the app URL as one that is registered or installed on the mobile device, and is found to have the appropriate URL scheme support required, the browser will open that app URL, resulting in the specific app being opened to the specific content found at the specific address requested. This launches the app in such a way that the browser is minimized. The app is not, for instance, loaded within a small frame inside the original web page.

Referring back to FIG. 9, Step 63 evaluates whether the app (here the Facebook application) is present on the mobile device 50 by attempting to load the application URL scheme. If the application URL scheme request successfully loads, the app will be opened to the specified page. If the application URL scheme fails to load definitively or within a set amount of time, the application-detection page then requests an alternate URL specified in the invention's URL configuration. As shown in step 64, if the Facebook app is available on the mobile device 50, the mobile device is redirected to the M&Ms profile page here in the manner described above; however if the app is not present on the mobile device 50 or fails to load, the mobile device is directed to the M&Ms profile page on the mobile version of the Facebook website as shown in step 65.

Figure 12:
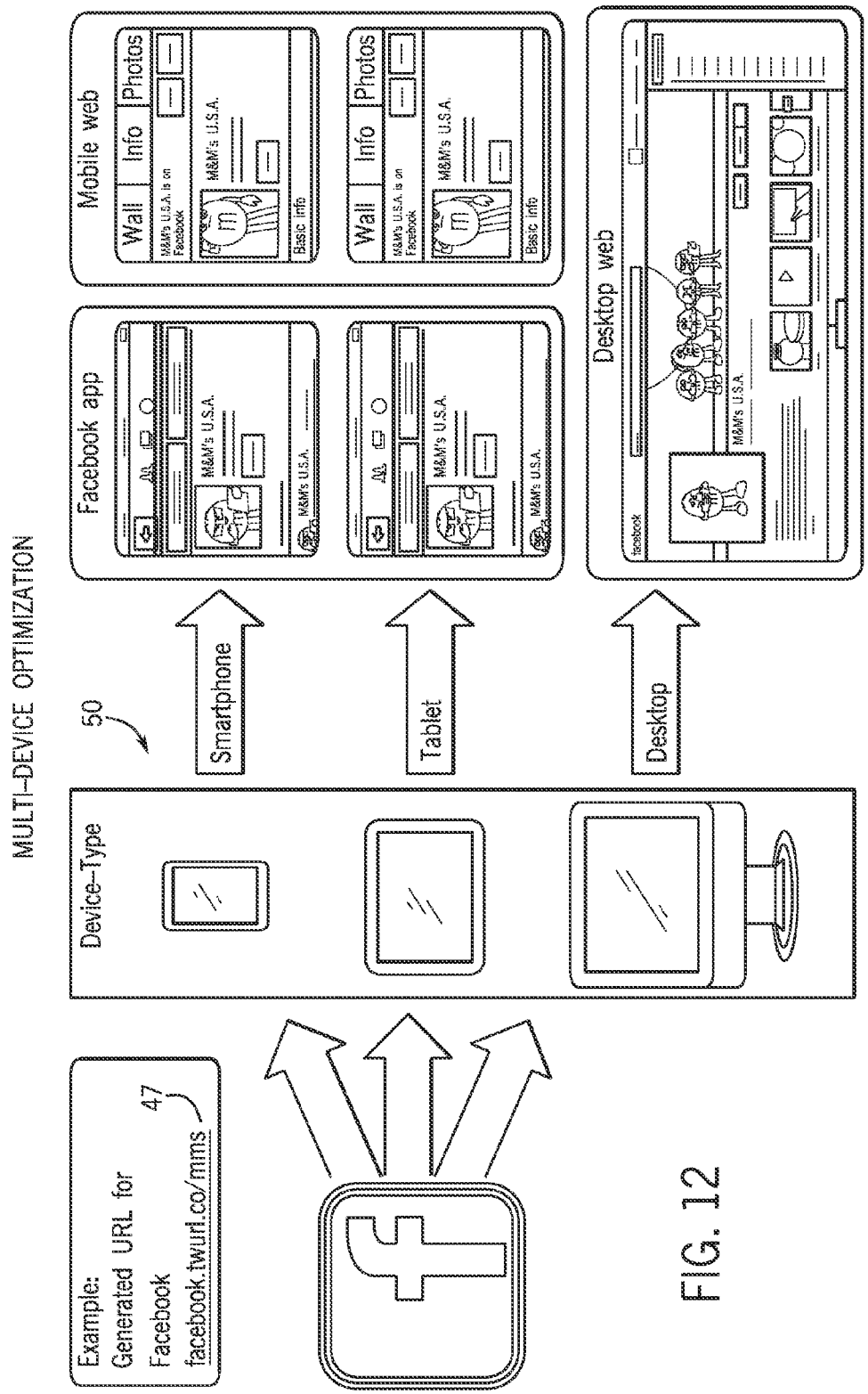
FIG. 12 is a graphic illustration of an example use of the URL resolution system in FIG. 11, showing how internet users can be routed to various destination landing pages based on device type and the presence or absence of an app on a mobile device.

By way of further illustration, FIGS. 11 and 12 show graphic illustrations of a process similar to that shown in FIG. 9. In FIG. 12, when the generated URL 47 is accessed, URL resolution system 21 associated with the URL management system 22 analyzes the mobile device 50 from which the URL has been accessed and then directs the internet user to the website or app according to instructions associated with the URL, which were provided by the owner of the URL. As shown by FIG. 12, if the URL is accessed from a smartphone or tablet, the detection system analyzes whether the Facebook app exists on the smartphone or tablet. If so, the URL will direct the Internet user to view the page for M&M's candy in the Facebook application. If this application is not on the smartphone or tablet, the internet user will be directed to view the webpage for M&M's candy on the mobile version of the Facebook website. Also, as shown in FIG. 12, if the URL is accessed from a desktop computer, the user will be directed to view the page for M&M's candy on the full-screen version of the Facebook website.

Turning now to FIG. 13, a visualization of one URL mapping scheme 70 in accordance with the invention is shown. The URL mapping scheme 70 is similar to a web page address, but includes instructions that identifies the mobile device 50 from which the request came and may direct the mobile device to open the specified internet content in an app, if available, or otherwise in a web browser present on the device. In the embodiment shown, the URL mapping scheme 70 creates up to five distinct pathways 72 (iPod, iPhone, iPad, Android Mobile, and Android Smartphone) to direct users to the appropriate app page that is optimized for their mobile device 50. Lastly, the URL-generating user supplies an alternate URL 74 to be accessed when a user accesses the URL from a non-targeted device (for instance, a desktop computer, etc.,) or who simply do not have the specified app installed on their mobile device 50.

FIGS. 14A-D show four example user-agent strings 76 associated with the distinct pathways 72 described above (iPod user-agent string not shown). As can be seen by referring to FIGS. 14 and 1, the URL mapping scheme 70 recognizes the user-agent string 76 for each of the five distinct pathways 72, thereby allowing the URL management system 22 to properly route the user to the optimized URL 73 for his mobile device 50. It should also be understood that URL management system 22 and URL resolution system 21 are shown in FIG. 1 as using two servers, namely application server 40 and HTTP server 30. However, a different number of servers could be used to perform the same features. It is possible that one server could perform the functions of both servers 30 and 41 shown in FIG. 1. A variety of devices could be used at conceptual steps/components involving inserting URLs generated by URL management system 22 into marketing media 51, communication between marketing media and internet 53, and ultimately with URL management interface 43. Additionally, URL management interface 43 could be cloud-based, accessed via a web-platform, or it could be installed directly onto computers of merchants or marketers.

In the embodiment shown conceptually in FIG. 1, it is contemplated that one person or company would manage URL management system 22 and resolution system 21 and sell URL management services to marketers or merchants. In such an embodiment, marketer and merchants would primarily interact with and access the URL mapping and routing system via the URL management interface 43. However, other ways of providing the services and methods associated with a URL mapping and routing system are included within the scope of this invention. For example, one merchant could perform and manage the functions of URL management system 22 and resolution system 21, and users of the URL management interface 43 could be internal divisions of the merchant or affiliates of the merchant such that URL management services contemplated are provided "in-house."

IV. URL Tracking

Figure 15:
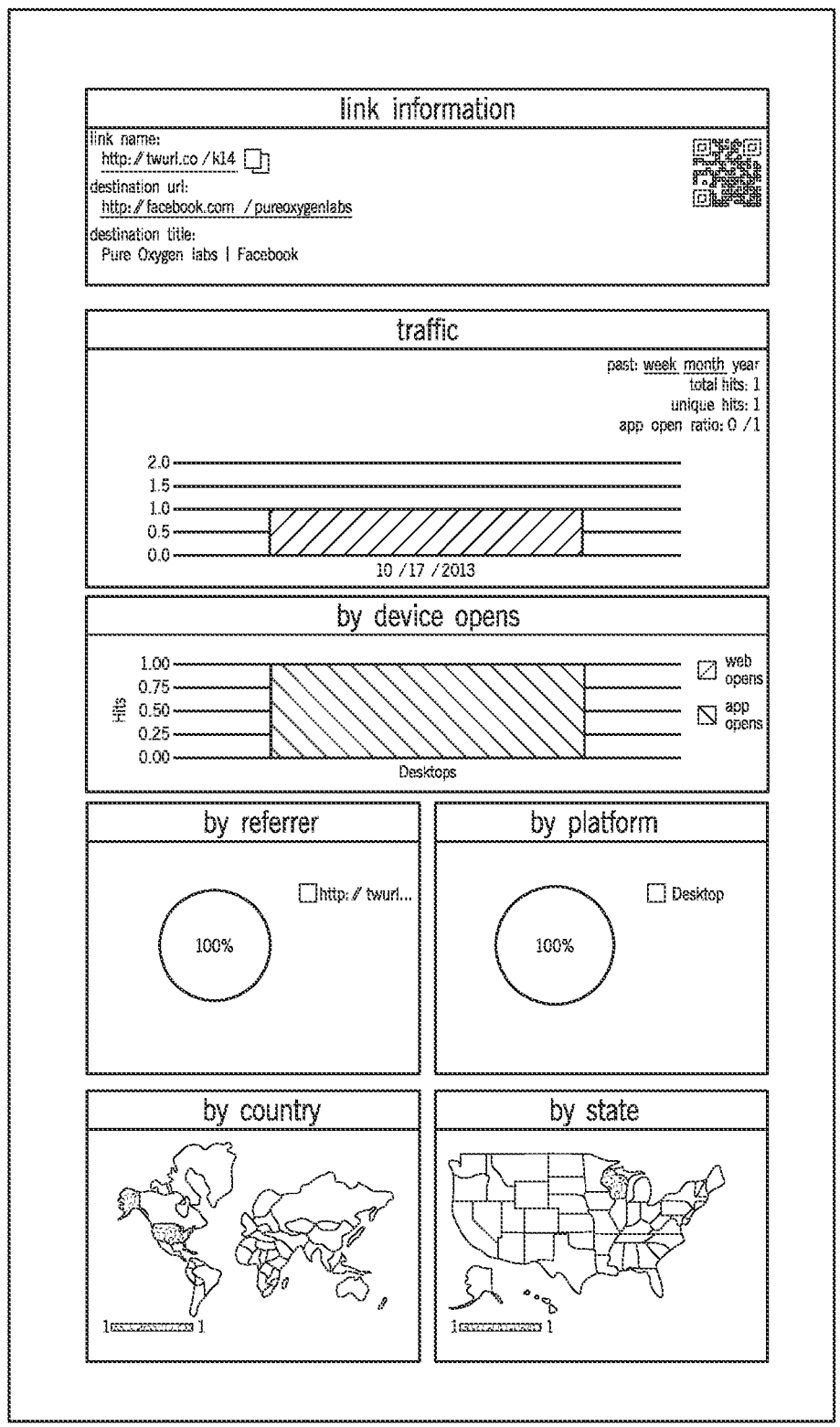
FIG. 15 is an illustration of a routing success tracking page in accordance with the invention.

Tracking cookies may be placed on the mobile device 50, which can be used to log the transaction and the mobile device information (e.g., date, IP address, browser user agent, etc.) in a database for reporting and statistical purposes. Tracking cookie technology is well-known. Here, cookie tracking may be used to track analytic and statistical information regarding internet-users that visit or view the final destination landing page as well as tracking which final destination landing pages are visited by users accessing URLs. A variety of metrics or statistics could be tracked in this manner, including, but not limited to, traffic information, referral source, dates, number of hits, times, number of unique users, etc. Hits database 32 in URL resolution system 21, hosted on HTTP server 30, can be used to log or store such information. HTTP server 30 may provide information back to application server 41 for analysis and ultimately for display in URL management interface 43. FIGS. 4 and 15 show example interfaces for managing and viewing tracking metrics and parameters.

The script 89 also provides a feedback mechanism for reporting whether an app was successfully opened via the intermediate landing page 88. The script 89 includes an indirect classification system that assumes the request succeeds until there is evidence the request failed. This occurs via a time-based logic sequence. As shown in FIG. 10, the intermediate landing page 88 first attempts to open the destination landing page by using Javascript to load the destination landing page URL into the address bar of the user's browser. This request occurs within 1 second of the intermediate landing page 88 loading on the mobile device 50. This request gets classified as a "pending" successful routing of the mobile device to the destination landing page. The way mobile device browsers work is that, if the app does open successfully, the browser and web page used to launch the app becomes inactive, until the user closes or minimizes the app and returns the browser as the active screen. To verify that the mobile device user was successfully routed to the destination landing page, the script 89 measures the time that has elapsed. In the embodiment shown, if the elapsed time is under 5 seconds from the time the request is made until the browser becomes inactive, the script 89 assumes the user was successfully routed to the destination landing page. If the elapsed time is greater than 5 seconds from the time the request is made until the browser becomes inactive, the script 89 determines the app did open and the user is automatically routed to alternate landing page. If the elapsed time is greater than 5 seconds, the script 89 assumes the app did not open and the user is now returning to their browser some time later and viewing the same intermediate landing page 88. Of course, the delay of 5 seconds is illustrative, and other embodiments may use delays of less or more time without departing from the invention.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A method for mapping and routing web URL requests from a web browser into a mobile application when installed on a computing device, without access to the computing device operating system's registry of installed applications, comprising the steps of:

generating a hosted URL address for mapping and routing, wherein the hosted URL address includes a domain name and a path name;

preparing and storing in a database, routing instructions for the hosted URL based on the path name, including specifying at least one preferred destination URL and at least one alternate URL for each of a specified target operating system;

receiving a header request from a computing device to access the hosted URL via a web browser resident on the requesting computing device, wherein the header request includes the hosted URL address and an identifying user-agent string of the web browser;

analyzing the header request to identify the path name of the hosted URL address and the requesting operating system as provided in the identifying user-agent string;

searching the database of routing instructions to identify the at least one preferred destination URL and the at least one alternate URL associated with the path name and the operating system provided in the header request;

retrieving from the database the identified at least one preferred destination URL and the at least one alternate URL providing an instruction to the computing device to redirect the web browser to the retrieved at least one preferred destination URL, wherein the instruction includes a web browser status request;

receiving the requested web browser status from the computing device indicating if the browser is in an active or inactive state; and if the web browser status is inactive, then providing an instruction to the computing device to redirect the web browser to the retrieved at least one alternate destination URL.

2. The method of claim 1, wherein the database is an application server.

3. The method of claim 1, wherein the preferred destination URL is present in a mobile application.

4. The method of claim 3, wherein the alternate landing page is a mobile version of a webpage and is displayed on the web browser of the computing device.

5. The method of claim 1, wherein at least one of the at least one preferred destination URL and the at least one alternate destination URL is chosen based on at least one of geographical location of the computing device and the time of day the header request is received from the computing device.

6. The method of claim 1 further including, receiving the at least one preferred destination URL and the at least one alternate destination URL from a form in communication with the database.

7. The method of claim 1 further including a computer having a processor and memory in communication with the database, for generating the hosted URL address, and preparing, and storing in the database, the routing instructions for the hosted URL.

8. The method of claim 1, wherein the computer includes a URL management interface for receiving the at least one preferred destination URL from a data entry form.

* * * * *